United States Patent
Rhoades

[15] 3,671,727
[45] June 20, 1972

[54] ADAPTIVE CONTROL

[72] Inventor: John M. Rhoades, Waynesboro, Va.

[73] Assignee: General Electric Company

[22] Filed: Sept. 10, 1970

[21] Appl. No.: 71,195

Related U.S. Application Data

[63] Continuation of Ser. No. 633,295, April 24, 1967, abandoned.

[52] U.S. Cl..................235/151.11, 235/150.1, 318/561, 318/632
[51] Int. Cl..................G05b 19/18, G05b 13/02
[58] Field of Search..................235/150.1, 151.1, 151.11; 318/569, 570, 571, 561, 632

[56] References Cited

UNITED STATES PATENTS

| | | | |
|---|---|---|---|
| 2,924,768 | 2/1960 | Farrand et al. | 318/632 X |
| 2,981,500 | 4/1961 | Carlton | 318/561 X |
| 2,988,681 | 6/1961 | Bower | 318/632 X |
| 3,109,970 | 11/1963 | Smyth | 235/150.1 X |
| 3,122,691 | 2/1964 | Centner et al. | 318/571 |
| 3,221,151 | 11/1965 | Cattel et al. | 318/561 X |
| 3,325,633 | 6/1967 | Lukens | 235/151.11 |
| 3,491,277 | 1/1970 | Brainard | 235/151.11 UX |
| 3,548,172 | 12/1970 | Centner et al. | 235/151.11 |

Primary Examiner—Eugene G. Botz
Assistant Examiner—Jerry Smith
Attorney—William S. Wolfe, Frank L. Neuhauser, Oscar B. Waddell and Joseph B. Forman

[57] ABSTRACT

To provide control for an automatic processing operation which is self-adapting to changes in operating conditions during the processing operation, selected combinations of the operating conditions are sensed and utilized to modify the programmed commands controlling the processing operation. Where the commands are in the form of digital signals, the recurrence rate of such signals is modified in a direction and at a rate which is a function of the sensed operating conditions.

25 Claims, 4 Drawing Figures

INVENTOR.
JOHN M. RHOADES
BY Michael Masnik
HIS ATTORNEY

INVENTOR.
JOHN M. RHOADES
BY Michael Masnik
HIS ATTORNEY

ADAPTIVE CONTROL

This application is a continuation of application Ser. No. 633,295 filed on Apr. 24, 1967 and now abandoned.

This invention relates to automatic processing operations and more particularly to controls that are self-adapting to changes in operating conditions during process operation.

In material processing or working operations, such as milling, drilling, boring, etc., a machine element and the material to be worked are relatively rotated and moved toward or away from one another at preselected speeds. The preselected feeds and rotational speeds are based upon the supposition that for any given material and tool, the various parameters such as machineability of material and geometry of the cutting tool would remain constant and therefore, the use of a single or preselected cutting speeds would produce an efficient cutting operation. In practice, the machining parameters do not remain constant but rather are constantly fluctuating so that the conventional cutting practices of the past are not the most efficient means. Cutters become dull and hard spots and areas of different machineability occur in the course of a cutting operation. In other processing operations similar changes take place requiring accommodation. For example, in a processing operation such as controlling the concentration of a first material being added to a solution of a second material, the second material may undergo changes affecting the concentration such as temperature, flow rate, etc.

The art is replete with attempts to solve these and similar problems. For example, in U.S. Pat. No. 2,754,567, an attempt was made to vary the feed in response to a strain gage located on the band saw. In U.S. Pat. No. 2,790,340, a dull tool was detected by back pressure on a hydraulic cylinder which operated to stop the machine. In U.S. Pat. No. 2,978,689, a dull tool was detected by using an axial thrust transducer which operated to stop the machine. U.S. Pat. No. 3,122,691 discloses an early effort at providing an adaptive control for numerically controlled machine tools. U.S. Pat. No. 3,259,023 discloses a scheme using various sensors which measure such factors as torque, spindle speed, feed and thrust for maintaining constant torque and thrust during a cutting operation. U.S. Pat. No. 3,248,629 describes an arrangement for providing spindle and feed reversal when a tapping machine hits a hard spot. The present invention to be described constitutes improvements over these earlier efforts.

It is therefore an object of this invention to provide a control arrangement which automatically adapts itself to process operation changes.

Another object of this invention is to provide a control arrangement for achieving optimum machine tool operation.

Another object of this invention is to provide a control arrangement for a machine tool which automatically adjusts various machining speeds for achieving improved working of materials of unknown or changing machineability.

A still further object of this invention is an improved control system for use in the numerical control of machine tools.

It is also an object of this invention to provide improved methods and means for sensing machine operating parameters and processing the sensed parameters to achieve improved machine control signals.

A further object is to provide improved signal processing methods and means.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings wherein:

Figure 1:
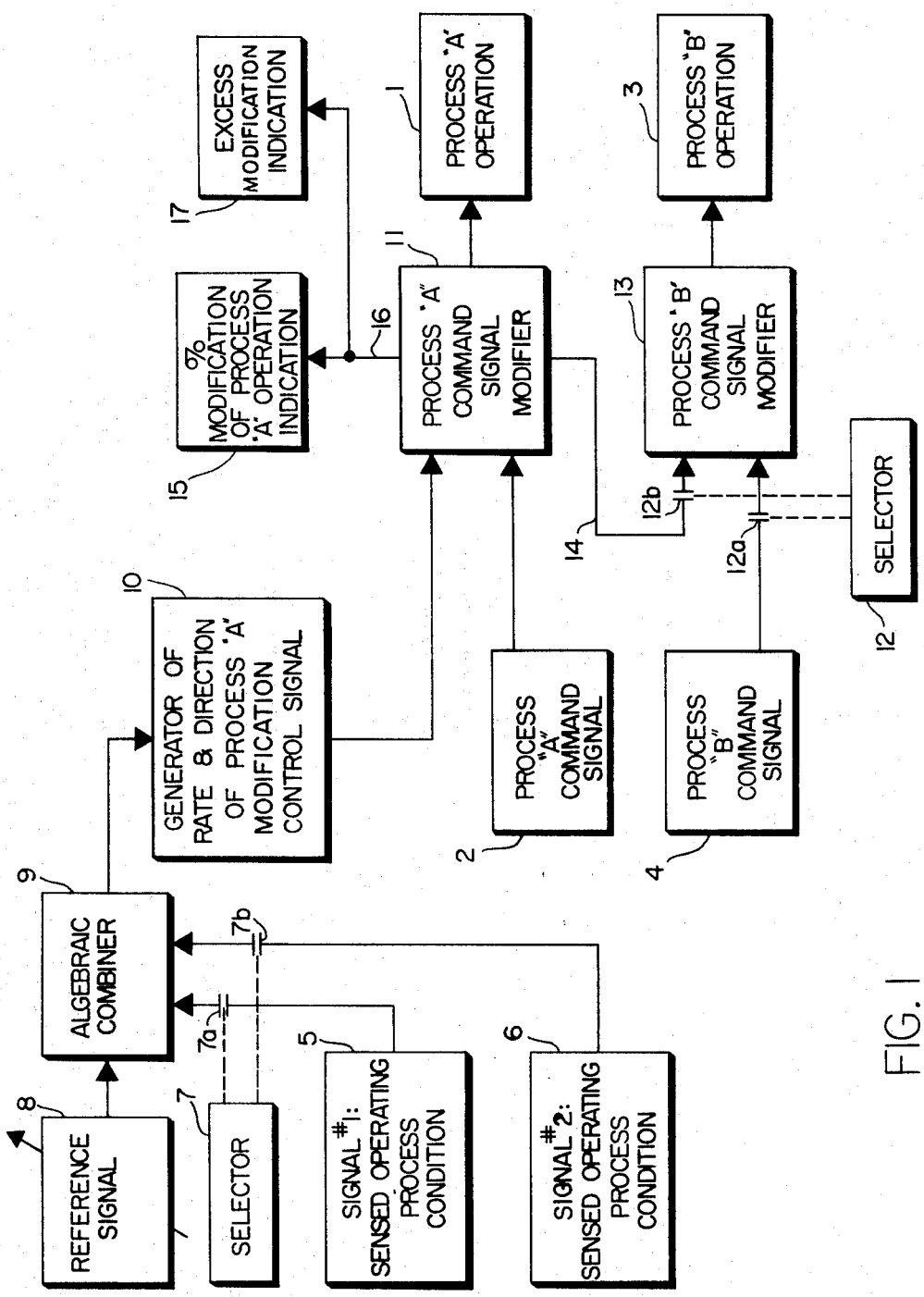
FIG. 1 is a block diagram of an adaptive control and its application to controlling a general processing operation.

Referring to FIG. 1 there is shown an adaptive control system involving a general processing operation. It is desired to control a process A operation 1 in response to a modifiable characteristic of an A control or command signal available from 2 and a B operation 3 in response to a modifiable characteristic of a B control or command signal available from a source 4. Where the conditions of operation are changing, it is desired to sense these changes as by the use of sensors 5 and/or 6 under control of the selector 7 associated with contacts 7a and 7b and compare the selected sensor outputs with a reference signal available from 8 in an algebraic combining circuit 9 to produce at the output of 9 an error signal representative of the departure of the selected sensor output from a reference value. The individual sensed signal outputs from 5 and 6 may be representative of an operating condition of process A, process B or a combination of process A and B conditions. A logic circuit 10 is provided which generates control signals identifying the rate with which modification of, say, the A command signals available from 2 is to take place and also the direction in which such modification is to take place. The actual modification takes place in modifier circuit 11 to which the outputs of 10 and 2 are applied. Upon modification of the A control signals in 11 under control of the signals available from 10, the modified A control signals are applied to 1 to accordingly control the Process A operation.

The control of the process B operation 3 is normally controlled by B command signals applied from 4 over contact 12a, closed by operation of selector 12, through signal modifier circuit 13. Process B operation thus proceeds under control of signals available from 4. However, upon further operation of selector 12, contact 12b closes and signal modifier responds to the modified signals available from 11 on lead 14 to modify the B command signals passing through 13 such that the process B operation proceeds under control of the modified B command signals available from 4.

Under appropriate circumstances, it may be desirable to indicate the degree of modification of process A operation that is being effected. To this extent an indicator 15 is made responsive to the modified A signals available from 11 over lead 16. Furthermore, an arrangement 17 is provided to respond to a given value of signals available over lead 16 to indicate such occurrence, as by an excess modification control being effected by 11, or provide an override function, as for example, to interrupt or further modify process operations.

The arrangement of FIG. 1 is particularly appropriate in connection with the control of machining operation — as for example, where the process A operation involves advancing or feeding a machining element toward a material or workpiece and where the process B operation involves rotating the machining element with respect to the material or workpiece.

Figure 2:
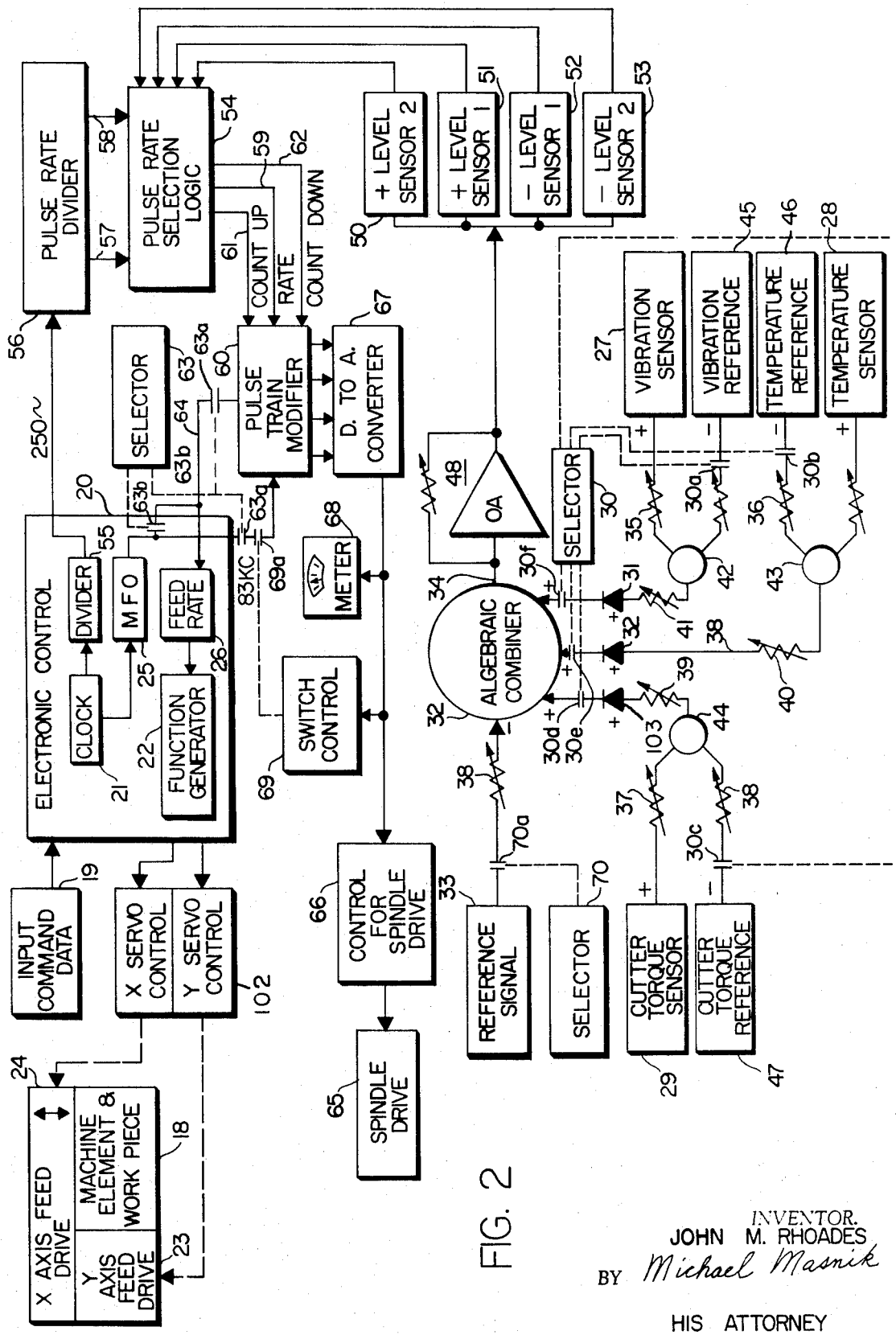
FIG. 2 illustrates in block diagram form a preferred embodiment of this invention.

FIG. 2 illustrates an application of the invention to electronic automatic systems and particularly where numerical controls are employed for controlling the motion of the machining or cutting element of a machine tool 18 relative to the material or workpiece in order to describe a contoured or complicated cutting path on the material or workpiece. Such equipments are commonly known as numerical contouring control systems. In such a system the velocity of the workpiece relative to the cutting tool is commanded at every instant during the cutting operation. The predetermined speed, path length and direction for each leg or cut which the machine is constrained to follow under the direction or command of a contouring control system is typically fed by 19 into the control system 20 in numerical form programmed on punched tape or punched cards, although in certain applications magnetic tape containing the digital information is used. This numerical input data is routed to appropriate subsystems of the control system, whereupon the control function is set into operation. In order that the numerical information be utilized by the electronic control equipment, the input data must be presented in an electrical form compatible with the overall system and which enables the control system to accurately control the speed and path of the machine tool relative to the workpiece. One form of representation of the velocity and path length data, known in the art, is a train of electrical pulses. In such a representation, each pulse of the train corresponds to a discrete increment of motion of the cutting tool relative to the workpiece, such that if the control system generates X pulses, the machine tool, in obeying the command of the control system, moves a distance of X times the incremental distance defined by each pulse.

When each pulse represents an incremental distance, the frequency of the pulses, that is, the pulse repetition rate, defines velocity and may be used to control the speed of motion of the machine tool. This is so, since pulse rate is convertible into increments of distance per unit of time. In one embodiment, the length of each cut is commensurate with numbers of pulses, and speed of motion of the cutting tool relative to the workpiece is commensurate with pulse frequency or rate.

A reference or basic source of pulses (a pulse clock) 21 is required for the purpose of generating the pulse frequency which is to be the standard of the system and from which other pulse rates may be generated for use in various parts of the system.

Referring to FIG. 2, there is disclosed a general block diagram of the overall numerical contouring control system. FIG. 2 is presented primarily to show the interrelationship of the three broad sections of the system; they are the machine tool itself, the servo system loop, and the overall electronic control section; and the manner in which an adaptive control arrangement is employed to modify the operation of the electronic control section. The general organization of the automatic control system comprehends that the path length and velocity commands of the control system are represented by the phase and rate of change of phase, respectively, of a pulse train available from or trains available from the function generator 22 applied to a servo mechanism 102 which is in turn coupled to, and drives, the machine tool 18. A sensing mechanism observes the position of the machine tool as the machine tool responds to the command signals, and generates a pulse train whose phase relative to a reference is representative of the present actual position of the machine tool. The phase of the commanded position signal is compared with the phase of the actual position signal so that an error signal directly proportional to the phase difference may be generated to provide feedback control in the feedback loop of the servo mechanism. The magnitude of the error signal, and its sense of polarity (determined by whether the phase of the command signal leads or lags that of the actual position signal) causes the machine tool to move in such direction as to tend to reduce the magnitude of the error signal.

The purpose of the entire system, of course, is to control, automatically, a machine tool by a Y axis feed mechanism 23 and an X axis feed mechanism 24. Feed mechanisms 23 and 24 comprise appropriate drive shafts and gearing which actuate the relative motion along two coordinates of the machine element and the material to be cut. It is to be understood that the system may be utilized for controlling machine elements in additional coordinates, but to simplify the explanation of the principles of the invention, a description of the third coordinate has been omitted. The machining element may be the cutting tool, itself, or may be the table holding the workpiece for material which is to be contoured. Alternatively, feed mechanisms 23 and 24 may control both the cutting tool and the motion of the workpiece. For the purpose of this discussion, assume that the machine element represents the cutting tool.

In normal operation the instructional data available from 19 of the speed with which the machining element 18 is to travel while performing its contouring function, the X and Y departures and their direction for the cut, are routed throughout the control in accordance with the programmed addresses. The pulse rate of the clock pulses from 21 is changed to the extent desired in manual feed rate override 25 and then converted by 26, by application through normally closed contact 63b, into a commanded pulse rate representative of the feed rate data specified by 19 before being transformed by function generator 22 into two commanded component pulse rates commensurate with the required velocities in the X and Y direction for application to the X and Y servo controls 102. The drives 23 and 24 respond to the outputs of the servo controls 102 to provide the desired motion of machine element with respect to the workpiece. For further details of such an arrangement, reference can be made to U. S. Pat. Nos. 3,283,129; 3,226,649 and 3,173,001.

Under certain circumstances, it is desirable to modify the command signals available from 21 and 25 in accordance with sensed conditions of the machining operation. To this end, clock pulses available from the manual feed override 25 are passed through an adaptive control arrangement for such modification before application through 26 to the function generator 22 and the servo controls 102.

In the embodiments shown in FIG. 2, it is desired to effect such modification in response to selected ones or combinations of the sensed values of vibration from 27, temperature from 28 and machine element torque from 29. Thus if sensed vibration is to control, then selector switch 30 closes contact 30f and positive values of sensor output are coupled through diode 31 to the algebraic combiner 32 for combining with a negative reference signal available from 33 to yield a vibration error signal on lead 34. In a similar manner, sensed temperature can produce a temperature error signal on lead 34 through closure of contact 30e, and a torque error signal through closure of contact 30d. In each of these instances an appropriate reference signal is made available from source 33. Resistors 35–39 provide any desired relative weighting to be assigned the several signals. Under certain circumstances, two or more of the sensor outputs can be simultaneously or sequentially applied to algebraic combiner 32 for combining with a reference signal from 33 to yield a composite error signal. Also, by selectively closing contacts 30a, 30b, 30c in addition to corresponding ones of 30d, 30e and 30f, the respective sensor outputs selected can be algebraically combined in respective combining circuits 42 – 44 with respective reference signals available from sources 45 – 47 before being applied to circuit 32 for combination with a reference signal from 33 to yield a corresponding error signal on lead 34.

The error signal, whether representative of only one or a plurality of sensed conditions, is amplified in operation amplifier 48 and applied to a plurality of level sensors 50 – 53. If the error signal from 48 is of a positive polarity, sensors 51 will respond if the amplitude of this error signal exceeds a first amplitude and sensor 50 responds if this error signal also exceeds a second amplitude greater than said first amplitude.

In a similar manner, if the error signal is of a negative polarity, sensor 52 will respond if the amplitude thereof exceeds a first amplitude and sensor 53 responds if this error signal also exceeds a second amplitude greater than said first amplitude. The outputs of 50 – 53 are applied to pulse rate selection logic circuit 54. The latter circuit also has applied to it, clock pulses after appropriate division in circuits 55 and 56. The output pulses from 56 are high rate pulses and low rate pulses available on leads 57 and 58 respectively. Depending on the signals available from 50 – 53, circuit 54 selects one of the two pulse rates available on leads 57 and 58 and applies the selected rate of pulses over lead 59 to pulse train modifier 60. In addition, also depending on the signals available from 50 – 53, a count-up logic signal is applied, for a positive error signal, over lead 61 to modifier 60 or a count-down logic signal, for a negative error signal, is applied over lead 62 to modifier 60. Modifier 60 receives feed rate pulses from the manual feed rate override 25 upon closure of contact 63a under control of selector 63 and assuming 69a is already closed. It should be noted that selector 63 also closes contact 63b and opens 63a where adaptive control is not to be utilized. These pulses are modified by modifier 60 at a rate and in a count-up or a count-down direction under control of the signals available on leads 59, 61 and 62. The resulting modified pulses are then applied over lead 64 to feed rate circuit 26 to control the desired axis feed or feeds. Thus the information from 19 generates command signals which are modified in accordance with desired sensed operating conditions that may be changing to effect improved, more efficient or safer machining operation.

Under certain circumstances, it is desirable to modify the control of a second process operation, such as spindle rotation speed of a machine tool. Normally the speed of the spindle drive 65 is controlled by a control arrangement 66. To provide the adaptive feature, the preselected control signals available in 66 are modified in response to signals available from converter 67. Converter 67 responds to the logic states of the pulse train modifier, to be described in greater detail, to produce an analogue signal having an amplitude proportional to the amount the pulse train available from 25 is being modified. This analogue signal in turn modifies the preselected spindle speed command signals available from 66 to alter the seed control of 65.

Also, where it is desired to indicate the degree of modification of the signals from 25, the analogue output from 67 can be displayed by a meter 68. Furthermore, it may be desirable to provide an override control when the degree of modification exceeds a certain value. In this connection 69 operating as a level sensor generates a control signal in response to a predetermined level of analogue signal to open contacts 69a — thereby further modifying the machining operation as by halting further machining operation.

While reference signal source 33 has been described as being employed to generate error signals by closure of contact 70a under control of selector 70, it may be desirable under certain circumstances to open contact 70a by selector 70 and permit the combined signals available from 42, 43, 44 or any combination thereof, to produce a count-down signal only by passage through combiner 32 without being combined with the reference signal from 33. In this case, the command pulses from 25 would be modified only in a count-down direction. This mode of operation permits programming desired feed rates with the sensed conditions essentially acting in a protective capacity.

Figure 3:
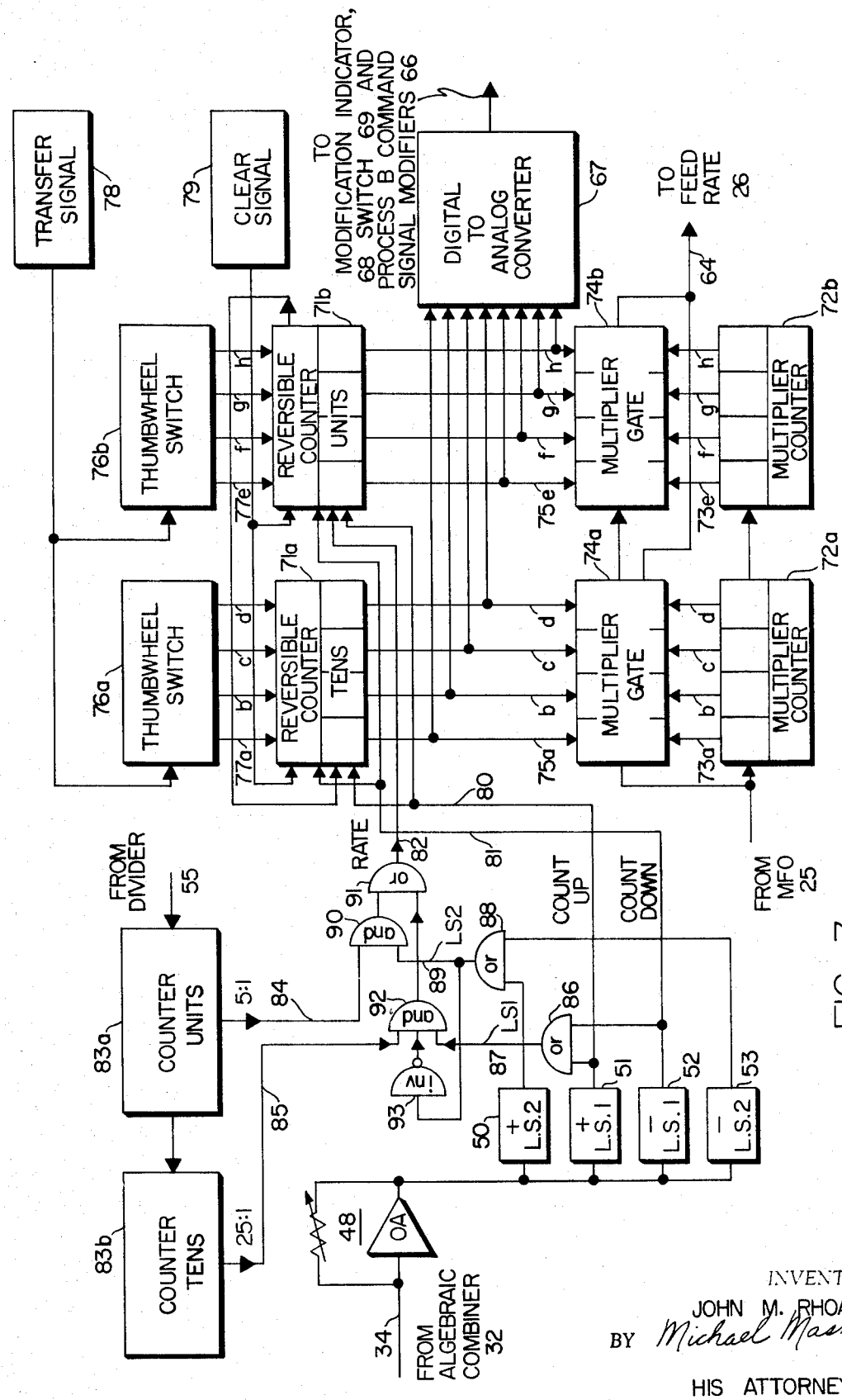
FIG. 3 illustrates the details of an improved pulse rate modifier circuit useful in adaptive control systems and one particularly useful in the arrangement of FIG. 2.

Referring to FIG. 3, there is shown in greater detail an arrangement for modifying the normal feed speed command signals in accordance with measurements taken of the machining process. There is available on lead 34 from the algebraic combiner circuit 32 an analogue signal whose amplitude represents a degree of modification of the normal feed speed. This analogue signal, of course, was obtained as previously mentioned by comparing weighted values of various sensed parameters such as vibration, temperature, deflection, torque, etc. with a reference signal to derive in effect an error signal. Before the normal feed pulse rate representing commanded feed rate is modified, the analogue error signal must be processed to produce count-up or count-down commands for modifying the normal feed pulse rate. This is accomplished by first amplifying the error signal in the operational amplifier 48 before applying it in parallel to the several level sensor circuits 50 – 53. The level sensors respond to the polarity and amplitude of the amplified error signals to produce respective logic signals on their output leads. Each of the level sensors are adapted to respond to a different combination of amplitude and polarities of the applied signals to produce an output logic state change from zero to one. For example, level sensor 50 is adapted to respond to a plus polarity and a relatively high signal amplitude of, say, 5 volts or more, level sensor 51 is adapted to respond to a plus polarity and a relatively low signal amplitude level of, say, 3 or more volts, level sensor 52 is adapted to respond to a negative polarity of a relatively low signal amplitude of, say, 3 or more volts and level sensor 53 is adapted to respond to a negative polarity and an amplitude of 5 or more volts. Thus, by way of example, for either polarity and an amplitude of less than 3 volts none of the level sensors respond and their output leads indicate a zero state. For a plus 7 volt signal, both sensors 50 and 51 would respond to indicate a one state. For the opposite polarity, level sensors 52 and 53 would respond to produce a one state indication. In effect, therefore, the level sensors provide threshold detectors which have a deadband between +3 and −3 volts, a first sense zone from +3 to +5, a second sense zone from above +5, a third sense zone from −3 to −5 and a fourth sense zone above −5. When the applied error signal is in the deadband zone, then it is desired that no modification control signals be made available to alter or modify the normal feed pulse rate. On the other hand, if the level sensor 51 yields a one state, then we would want to count up at a first rate. On the other hand, if level sensor 50 also yields a one state, then we would want to count up at a higher rate. In a similar manner, it is desired to count down at two different rates depending on what ranges of error signals have been detected.

The pulses available from the manual feed speed override 25 are adapted to have their recurrence or pulse rate modified in accordance with the logic states developed at the outputs of 50 – 53 to produce modified rate pulses on lead 64 for application to the contouring control to control the rate of feed drive. Essentially, 71a and b is a reversible counter adapted to change the states of its binary stages in accordance with applied signals. The signal states available on leads 75a–h control operation of respective ones of gates 74. Operation of the gates 74 combines various ones of the series of pulse trains of different pulse rates available on leads 73a–h and arising as a result of the counting of the pulse from 25 by counter 72. For purposes of discussion, let us assume that the multiplier gates 74 operate in a manner such that only 50 percent of the input pulses on 25, or a 41.5 kc feed pulse rate is available on lead 64. Multiplier gates 74 are controlled to produce the 50 percent multiplication by the signal states available on leads 75a–h from the reversible counter 71. The signal states representing the 50 percent counting factor is established by thumbwheel switches 76a and b. Thumbwheel switches operate to produce, depending upon degree of rotation, a binary coded decimal signal available on leads 77a–h. Thus, for example, a counting factor of 50 percent would be represented by a one state on the leads 77e and 77g associated with the 10 and 40 binary counting stages. The selection established by the thumbwheel 76 is controlled by a transfer signal source 78 to provide the proper logic states on the leads 77a–h. The clear signal available from source 79 applied to the reversible counter 71 clears the previously established counting factor for the pulse rate multiplier. After operating the clear signal source 79, a new rate can be cranked in by operating the thumbwheel 76 and the transfer signal source 78.

In order for the system to operate in an adaptive manner, signals are applied to the reversible counter which indicate whether the pulse rate modifier should count up or count down from the preset rate established by the thumbwheel switches 76 and at what rate it will count up or count down. The count-down or count-up signals are available on leads 80 and 81 whereas the rate for count-up or count-down is provided by a signal available on lead 82.

We have previously described how the count-down or count-up signal is made available on leads 80 and 81. Attention is now directed to the selection of the rate at which the countup or countdown will occur. In the present embodiment, it is desired that when the applied error signal is in the positive or negative upper sense zones, then the count-down or count-up pulse rate will be at a 50 cycle per second rate or some other selectable high rate whereas if we are in the positive or negative lower sense range zones, then the count-down or count-up rate would be at a 10 cycle per second rate or some other selectable low rate. The proper pulse rate is achieved by applying pulse signals such as at a 250 cycle per second rate available from the contouring control and representing a division of the normal clock pulses in 55 to a pair of decade counters 83. Pulses from decade 83a available on lead 84 have been counted down in the ratio of 5:1 and represent the 50 cycle per second pulse rate whereas pulses available on lead 85 from decade 83b represent a 25:1 division or pulses at the 10 cycle per second rate. OR gate 86 responds to level sensors 51 or 52 to produce a logic 1 signal on lead 87. OR gate 88 responds to level sensors 50 or 53 to produce a logic 1 signal on its output lead 89. AND gate 90 responds to the logic 1 signal available on lead 89 to apply the 50 cycle per second pulses from lead 84 to the OR gate 91. AND gate 92 responds to the logic 1 signal available on lead 87 and the absence of a logic 1 signal at the input of inverter 93 to pass the 10 cycle per second pulses available on lead 85 to the OR gate 91. OR gate 91 responds to whether the 50 cycle per second signals or the 10 cycle per second signals are being applied thereto to couple such signals to the reversible counter 71. Thus, if we are in the upper sense zone, then the 50 cycle per second signals are being applied over lead 82 to the reversible counter 71 and depending on the polarity, counter 71 is counted down or up as established by the level states appearing on leads 80 and 81.

Let us assume that in the normal operation, the thumbwheel switches 76 have been initially set such that 50 percent of the pulses available from 25 are being delivered over lead 64 for application to the control as modified feed rate pulses. If the error signal developed on lead 34 indicates a count-down condition on lead 81, then the reversible counters operate to count down at the 50 or 10 cycle per second rate depending on the output of 82. The counting by the reversible counter 71 causes the states of the signals available on leads 75a–h to change in such a direction that the multiplier gates 74 pass a combination of the separate pulse trains available on leads 73a–h resulting in a decreasing rate of pulses being developed on lead 64. In a similar manner, a count-up signal available on lead 80 and applied to the reversible counter 71 would cause the reversible counter to change state in such a manner that the modified feed rate pulses available on lead 64 change from a 50 percent level to a higher level at a rate depending upon whether the pulses available on lead 82 are the high speed or low speed pulse rates of 50 cycles or 10 cycles per second.

Thus, it is seen that depending upon the amplitude and polarity of the error signal available on lead 34, the pulse rate modifier arrangement of FIG. 3 causes the pulses available on lead 64 to change rate from its preselected ratio of the feed command signals available from 25 in a given direction and at a given rate. Thus, depending upon the values of the operating conditions being sensed, the feed rate is changed in a proper direction and at a related rate. As the machining conditions being sensed change, the feed rate follows to improve the machining operation.

It should be noted that weighting of the respective binary stages of the reversible counter and the multiplier counter are preferably different, for example, 1, 2, 4, 8 and 1, 2, 4 5 in order to improve the uniformity of the pulse distribution in the resulting pulse pattern available at the output lead 64. For further details of the functioning of a pulse rate multiplier reference can be made to U.S. Pat. No. 3,283,129.

Figure 4:
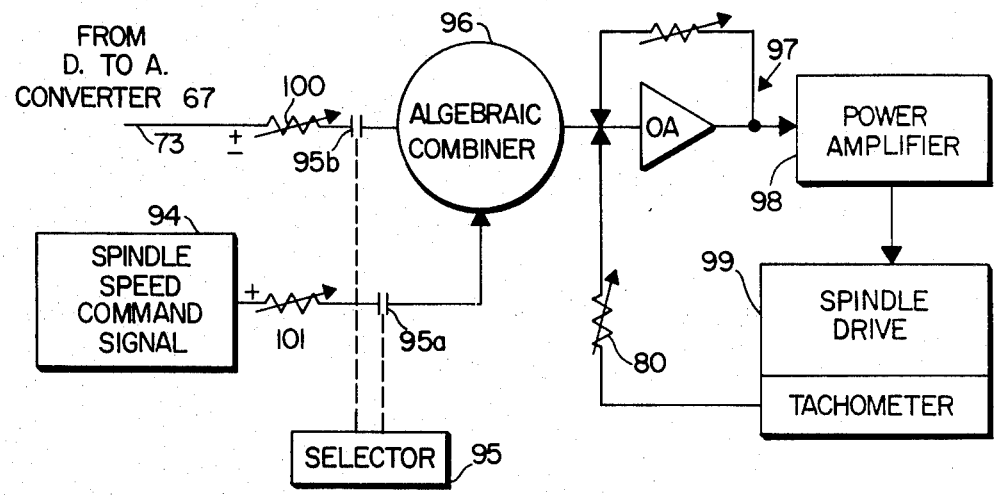
FIG. 4 illustrates the details of the adaptive control of FIG. 3 as applied to controlling the speed of rotation of a machining element.

FIG. 4 shows a particular spindle drive arrangement, as contrasted with the general arrangement shown in FIG. 2, wherein the preselected spindle speed command signal available from 94 is applied through closed contacts 95a under control of selector 95 to an algebraic combiner 96 for combining with a modification signal available from converter 67 upon closure of 95b under control of selector 95. Upon being combined, the modified command signal is successively amplified in operational amplifier 97 and power amplifier 98 before being utilized to drive the spindle drive or motor 99. If the signal from 67 is positive, the motor speed is increased from the commanded level, whereas if the signal is negative, the motor speed is decreased. The weighting of the signals available from 67 is modified by the relative setting of resistors 100 and 101. To improve the accuracy of speed control, a tachometer provides velocity feedback through resistor. Where adaptive control is not desired, selector 95 can be operated to close contact 95a and open contact 95b. The adaptive control arrangement of FIGS. 2 and 3 provided that the rate of the pulses from a clock source, as selected by a manual feed override, were to be modified by a percentage equal to the number in a reversible counter which number is further modified by the amplified and classified error signals resulting from the selective combining of reference and sensed operating condition signals. It may be desirable to modify not the manual feed override output, but the clock pulses directly, or the output of the feed rate circuit and under appropriate circumstances, the function generator outputs associated with the respective command channels. Also, while means were disclosed to direct the reversible counter to count down, or count up, or not count depending on whether appropriate logic state signals were developed on leads 80, or 81, or neither, at one of two fixed rates, it is considered within the scope of this invention to provide such count-up or count-down at more than these two rates or even at proportional rates. Furthermore, under certain circumstances such as the initiation of the cutting condition, it may be desirable to delay the adaptive process for a brief period of time until sensors or other conditions have stabilized. For example, in the arrangement of FIG. 3, the count-down or count-up signals available on leads 80 and 81 can be time delayed a given amount as by "anding" them with a time delay signal before application to the reversible counter.

What I claim as new and desire to secure by Letters Patent of the United States is:

1. A machine for working a material with a machine element comprising;
    first drive means for providing a first relative motion between said element and said material;
    means for sensing a first working characteristic of said element while said material is being worked by said element to produce a first working characteristic signal;
    means for producing a first reference characteristic signal;
    means responsive to the difference between said first working characteristic signal and said first reference characteristic signal to provide a first error signal;
    a pulse rate modifier;
    a logic circuit;
    a source of first command pulses occurring at a first rate;
    means for applying said first command pulses to said pulse rate modifier;
    means for coupling said first error signals to said logic circuit;
    said logic means coupled to said pulse rate modifier and responsive to said coupled first error signals for controlling the modification of the pulse rate of said applied first command pulses as a function of the value of said error signal;
    said first drive means responsive to said modified applied first command pulses to provide a first relative movement between said element and said material in accordance with said modified first pulse rate.

2. An arrangement according to claim 1 wherein said logic circuit comprises means responsive to at least the polarity of said applied error signal to cause said pulse rate modifier to modify said first command pulses in an increasing pulse rate direction for one polarity and a decreasing pulse rate direction for the other polarity at a desired rate.

3. An arrangement according to claim 2 wherein said logic circuit also responds to the value of said error signal to cause said pulse rate modifier to modify said first command pulses at a first rate for one range of values of said error signal and at a second different rate for a second range of values of said error signal.

4. An arrangement according to claim 3 wherein said pulse rate modifier comprises a reversible counter, multiplier gates and a multiplier counter;
    means for coupling said first command pulses to said multiplier counter to divide said first command pulses into a series of pulse trains of different pulse rate;

means for coupling said logic circuit to said reversible counter to cause said reversible counter to count-up or count-down at said selected rate;

said logic circuit producing a count-up or a count-down logic state signal and control pulses occurring at said selected rate;

said gates being coupled to said reversible counter and multiplier counter and responsive to said first command pulses to produce said modified first command pulses.

5. An arrangement according to claim 4 further comprising a digital to analogue converter coupled to said reversible counter to produce an analogue signal having a value representative of the efficiency with which said material is being worked by said element.

6. An arrangement according to claim 5 further comprising means responsive to said analogue signal to interrupt at least one of said relative motions between said element and said material.

7. An arrangement according to claim 1 further comprising means for sensing a second working characteristic of said element while said material is being worked by said element to produce a second working characteristic signal;

means for producing a second reference characteristic signal;

means responsive to the difference between said second working characteristic signal and said second reference characteristic signal to provide a second error signal;

said coupling means further comprising means for combining said first and second error signals to produce a composite signal and for applying said composite signal to said logic circuit.

8. An arrangement according to claim 7 comprising;

second drive means for providing a second relative motion between said element and said material;

a source of a second command signal;

means responsive to said analogue signal for modifying the value of said second command signal as a function of the value of said analogue signal;

said second drive means responsive to said modified second command signal to provide a second relative movement between said element and said material in accordance with the modified value of said second command signal.

9. An arrangement according to claim 8 wherein said first motion is lineal motion.

10. An arrangement according to claim 8 wherein said second relative motion is rotational motion.

11. An adaptive controller for a process for controlling an operation A in response to a modifiable characteristic of an A control signal, and an operation B in response to a modifiable characteristic of a B control signal comprising;

means for sensing at least one condition of said process when controlling to provide a first sensed signal;

means for producing a first reference signal;

means responsive to said first sensed and first reference signals to provide a first error signal;

means responsive to said first error signal for modifying said modifiable characteristic of said A control signal as a function of the value of said first error signal;

means responsive to said modified A control signal for controlling the processing of said operation A in accorance with its modified characteristic;

means responsive to said modified A control signal for modifying said modifiable characteristic of said B control signal;

and means responsive to said modified B control signal for controlling the processing of said operation B in accordance with its modified characteristic.

12. An arrangement according to claim 11 wherein said A control signal is a pulse signal having a modifiable recurrence rate and said means for modifying said modifiable characteristic of said A control signal is a pulse rate modifier circuit.

13. An arrangement according to claim 12 wherein said B control signal is an analogue signal having a modifiable characteristic and said means for modifying said B control signal comprises a digital to analogue converter for converting said modified A control signal to analogue form.

14. A material working machine for moving a machine element relative to a material comprising;

first and second drive means for providing first and second relative motions between said element and said material;

means for sensing a plurality of different working characteristics of said element to produce a plurality of working characteristic signals;

means for adjusting the relative weighting of the values of said working characteristic signals;

a source of reference characteristic signals;

means for comparing said working characteristic signals with said reference characteristic signals to provide an error signal;

a source of first command pulses occurring at a first rate;

a source of second command signals;

means responsive to said error signal for modifying the pulse rate of said first command pulses as a function of the value of said error signal;

said first drive means responsive to said modified first command pulses to control said first relative motion of said element and said material at a speed proportional to said modified first pulse rate;

means responsive to said modified first command pulses to modify the value of said second command signal;

and said second drive means responsive to said modified second command signal to control said second relative motion of said element and said material at a speed proportional to the value of said modified second command signal.

15. An arrangement according to claim 14 wherein said means for sensing comprises means for sensing at least one of the following working characteristics: element temperature, element vibration, element deflection and element torque developed during working of said material by said element.

16. A machine for working a material with a machine element comprising;

first drive means for providing lineal motion of said element with respect to said material;

second drive means for providing rotational motion of said element with respect to said material;

means for sensing the working temperature of said element to produce a working temperature signal;

means for sensing the working vibration of said element to produce a working vibration signal;

means for sensing the deflection of said element to produce a working deflection signal means for sensing the working torque developed by said element;

means for adjusting the relative weighting of the values of said temperature, vibration, deflection and torque signals;

means for producing corresponding reference signal for each of said sensed signals;

means responsive to selected ones of said working temperature, vibration, deflection and torque signals and their corresponding reference signal to provide a composite signal;

a source of first command pulses occurring at a first rate;

a source of a second command signal;

means responsive to said composite signal for modifying the pulse rate of said first command pulses as a function of the value of said composite signal;

means responsive to the modified pulse rate of said modified first command pulses to produce a first control signal;

said first drive means responsive to said modified first command pulses to control the lineal motion of said element with respect to said material at a speed proportional to said modified first pulse rate;

said second drive means responsive to said second command signals and said first control signals to control the rotational motion of said element with respect to said material.

17. A machine for working a material with a machine element comprising;
first drive means for providing an output establishing a first relative motion between said element and said material;
means for sensing a first working characteristic of said element while said material is being worked by said element to produce a first working characteristic signal;
means for producing a first reference characteristic signal;
means responsive to the difference between said first working characteristic signal and said first reference characteristic signal to provide a first error signal;
a source of first command pulses occurring at a first rate,
means responsive to said first error signals and said first command pulses for producing second command pulses having a repetition rate which is a function of the value of said error signals and the rate of said first command pulses;
said first drive means responsive to said second command pulses such that changes to said second command pulses resulting from said first error signal produce changes in the output of said first drive means in a direction to reduce the value of said error to an acceptable value.

18. A machine for working a material with a machine element comprising;
first drive means for providing an output establishing a first relative motion between said element and said material;
means for sensing a first working characteristic of said element while said material is being worked by said element to produce a first working characteristic signal;
means for producing a first reference characteristic signal;
means responsive to the difference between said first working characteristic signal and said first reference characteristic signal to provide a first error signal;
a source of first command pulses occurring at a first rate;
means responsive to said first error signals and said first command pulses for producing second command pulses having a repetition rate which is a function of the rate of said first command pulses and the integral of the value of said error signal;
said first drive means responsive to said second command pulses such that changes to said second command pulses in response to said first error signal produce changes in the output of said first drive means in a direction to reduce the value of said error to a predetermined value.

19. A system to effect a desired result comprising first system input means for effecting said result;
means for sensing the value of some characteristic of said system to produce a first working characteristic signal;
means for producing a first reference characteristic signal;
means responsive to the difference between said first working characteristic signal and said first reference characteristic signal to provide a first error signal;
a source of first command pulses occurring at a first rate,
means responsive to said first error signals and said first command pulses for producing second command pulses having a repetition rate which is a function of the value of said first error signals and the rate of said first command pulses;
said first system input means responsive to said second command pulses such that changes in the repetition rate of said second command pulses in response to said first error signal produce changes in the value of said first system input means in a direction to change the value of said first error signal to an acceptable value.

20. A system to effect a desired result comprising first system input means for effecting said result;
means for sensing the value of an operating characteristic of said system to produce a working characteristic signal;
means for producing a reference characteristic signal;
means responsive to the difference between said first working characteristic signal and said first reference characteristic signal to provide a first error signal,
a source of first command pulses having a given recurrence rate,
means responsive to said first error signals and said first command pulses for producing second command pulses having a recurrence rate which changes at a rate proportional to the value of said first error signals;
said first system input means responsive to said second command pulses such that changes in the recurrence rate of said second command pulses in response to said first error signal produce changes in the value of said first system input means in a direction to change the value of said first error signal to a predetermined value.

21. A material working machine for moving a machine element relative to a material comprising;
first and second drive means for providing first and second realtive motions between said element and said material;
means for sensing a plurality of different working characteristics of said element to produce a plurality of working characteristic signals;
means for selecting desired ones of said working characteristic signals;
means for adjusting the relative weighting of the values of said selected working characteristic signals;
a source of reference characteristic signals;
means for comparing said relative weighted working characteristic signals with said reference characteristic signals to provide an error signal;
a source of first command pulses occurring at a first rate;
a source of second command signals;
means responsive to said error signal for modifying the pulse rate of said first command pulses as a function of the value of said error signal;
said first drive means responsive to said modified first command pulses to control said first relative motion of said element and said material at a speed proportional to said modified first pulse rate;
means responsive to said modified first command pulses to modify the value of said second command signal;
and said second drive means responsive to said modified second command signal to control said second relative motion of said element and said material at a speed proportional to the value of said modified second command signal.

22. Apparatus according to claim 21 wherein said means for selecting desired ones of said working characteristic signals comprise means for automatically selecting said desired ones of said working characteristic signals according to a predetermined relationship.

23. Apparatus according to claim 21 wherein said selected ones of said working characteristic signals comprise the one signal which first exceeds a predetermined limit.

24. Apparatus according to claim 21 wherein selected ones of said working characteristic signals are sequentially compared with said reference characteristic signals to provide an error signal.

25. Apparatus according to claim 24 wherein said reference characteristic signals comprise a plurality of reference characteristic signals and means for selecting desired ones of said reference characteristic signals for comparison with respective ones of said selected working characteristic signals to provide said error signal.

* * * * *